Dec. 16, 1924.
K. B. HARVEY
AUTO TABLE
Filed Oct. 31, 1922
1,519,977
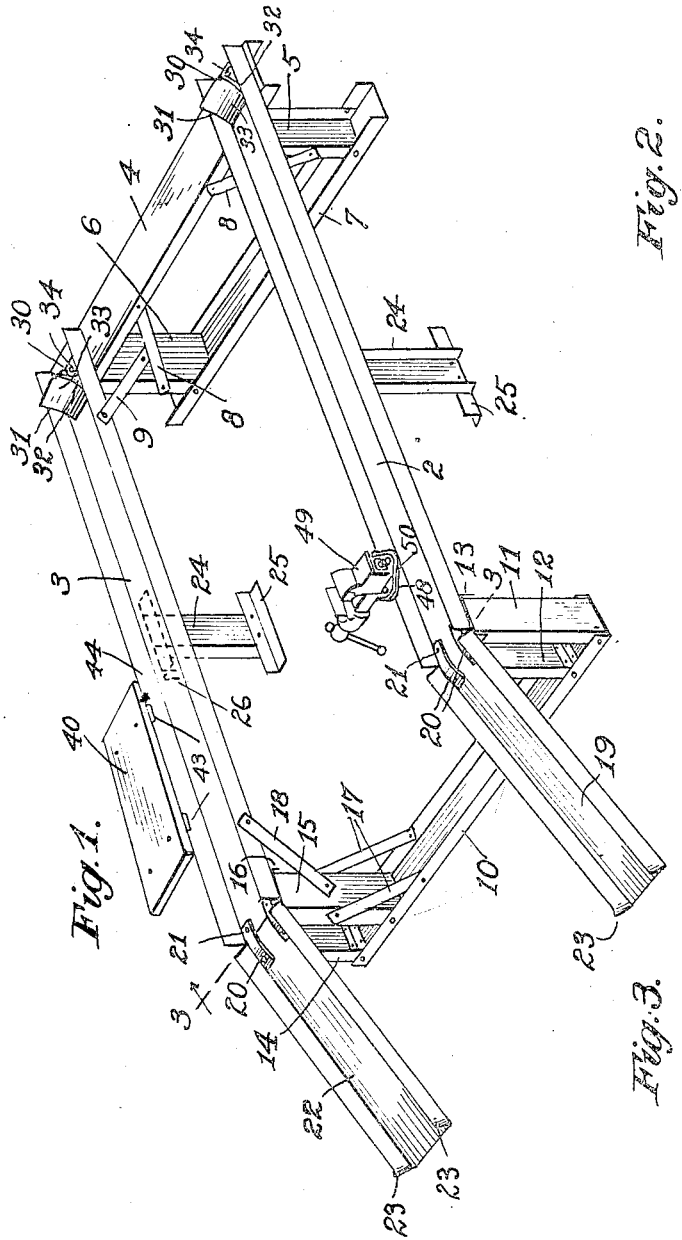
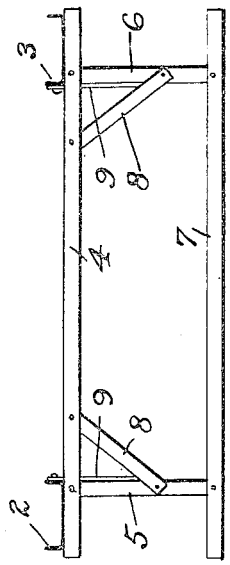
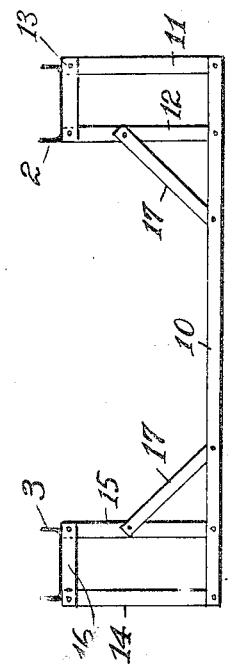
Inventor
K. B. Harvey
By his Attorney
Wm. H. Reid.

Patented Dec. 16, 1924.

1,519,977

UNITED STATES PATENT OFFICE.

KELLY B. HARVEY, OF NEW YORK, N. Y., ASSIGNOR TO AUTO TABLE CO., INC., OF RICHMOND HILL, LONG ISLAND, NEW YORK, A CORPORATION.

AUTO TABLE.

Application filed October 31, 1922. Serial No. 598,102.

*To all whom it may concern:*

Be it known that I, KELLY B. HARVEY, a citizen of the United States, and a resident of New York city, in the county of New York and State of New York, have invented certain new and useful Improvements in Auto Tables, of which the following is a specification.

The object of the present invention is to provide an apparatus that will permit an automobile of any kind to be placed on a support elevated a few feet above the ground or floor, which vehicle can be caused to run up thereon by an incline, by its own power or by a windlass on the apparatus to facilitate inspection and operation of the vehicle.

In the accompanying drawing showing one embodiment of my invention, Figure 1 is a perspective view thereof.

Fig. 2, shows a front end.

Fig. 3, shows the other end with the inclined bars removed.

As shown in the drawings, I provide a pair of bars 2 and 3 of channel form, that are suitably supported by upright bars, and the latter are mounted on transverse bottom bars. The side bars are connected at one end by a transverse bar 4 of inverted channel form that is bolted thereto, and this cross bar is supported at its ends by upright bars 5 and 6 also of channel form, caused to enter the inverted channel bar 4 between the flanges and bolted thereto. These upright bars are supported by a bottom bar 7 of channel form and the upright bars fit into the channel bar with the flange portions bolted together. If desired brace pieces 8 are secured at an angle between the uprights and the cross bar 4; also braces 9 may be secured between each upright bar and the side bar as shown.

At the opposite ends of the side bars 2 and 3 they are supported by a pair of upright bars at the end of each side bar and these uprights are mounted in a transverse bottom bar, 10 with the flanges projecting upwardly. At one end, I arrange upright channel bars 11 and 12 of channel form, and a short channel bar 13 connects the upper ends of the upright bars 11 and 12, which bar 13, has a length equal to the width of the side bar 2, that rests on this short bar and is bolted thereto. On the opposite side I arrange similar upright channel bars 14 and 15, having a short cross bar 16 of channel form, secured to the ends of the uprights, and bolted to the under portion of the side bar 3. At this end of the device I preferably omit a cross bar that would extend entirely across between the side bars 2 and 3, so to give better access to the car on the frame. The uprights may be connected with the base bar 10 by short bars 17 extending at an angle to each member, as shown, that will prevent side sway of the uprights at this end of the device. A brace 18 may also connect the uprights with the side bars at an angle to each, to better strengthen the structure.

At this open end I provide a run-way for the wheels to permit the car to be run or drawn up on to the side bars. At the end of the side bar 2 I connect a channel bar 19, having one end detachably secured to the side bar 2 and its other end resting on the ground or floor. A pair of short bars 20 are secured to this inclined bar with the projecting ends provided with a bolt 21 adapted to enter a hole in the side bar, whereby the inclined bar can be readily attached and removed. A similar inclined bar 22 is attached to the other side bar 3, and may be removably attached in the same manner. At the bottom of these inclined bars, the corners 23 of the flanges are bent outwardly, so that they will not engage or injure the rubber tires on the vehicles, and also serve to guide the wheels into the channel bars.

I further provide a support at the intermediate portion of the table, that is shown as comprising an upright channel bar 24 having an angle bar 25 secured at its lower end, and a similar angle bar 26, fast to its upper end. The latter is bolted to the under face of the side bar 3. A similar arrangement of upright bars and two angle bars is arranged on the opposite side to support the side bar 2, as shown.

It is to be understood that in the use of this device, a car is simply brought to the ground ends of the inclined bars 19 and 22, and then run up on to the side bars, that can be done under its own power, or a winch might be attached to the cross bar 4 at the far end.

What I claim is:

An automobile support comprising a pair of parallel channel members constituting base supports and arranged with their flanges turned upwardly, the first of said members forming a rear base member and the second forming a front base member, vertically disposed channel members secured between the flanges of the rear base member and extending upwardly from points adjacent the extremities of the rear base member, a transverse rear channel member having its flanges turned downwardly and seated on top of the vertically disposed channel members to tie the upper ends thereof together, a plurality of pairs of vertically disposed channel members extending upwardly from the ends of the front base member and having their lower ends disposed between the flanges of said front base member, a pair of horizontal channels having their flanges turned upwardly, each of said pair having one end resting on and connected to a respective end of the transverse rear channel member and its remaining end supported by and connected to a respective pair of the front vertical members, and channel iron skids extending downwardly and forwardly from the front ends of said horizontal channels.

KELLY B. HARVEY.